US012810270B2

(12) United States Patent
Krishnaswamy et al.

(10) Patent No.: US 12,810,270 B2
(45) Date of Patent: Nov. 24, 2026

(54) SYSTEM AND METHOD FOR CREATING NON-FUNGIBLE TOKENS (NFTs) ON A BLOCKCHAIN PLATFORM

(71) Applicant: JIO PLATFORMS LIMITED, Ahmedabad (IN)

(72) Inventors: Dilip Krishnaswamy, Bangalore (IN); Madhava Dudipalli, Bangalore (IN); Rajeev Gupta, Mumbai (IN)

(73) Assignee: JIO PLATFORMS LIMITED, Ahmedabad (IN)

( * ) Notice: Subject to any disclaimer, the term of this patent is extended or adjusted under 35 U.S.C. 154(b) by 285 days.

(21) Appl. No.: 18/247,472

(22) PCT Filed: Mar. 24, 2023

(86) PCT No.: PCT/IB2023/052929

§ 371 (c)(1),
(2) Date: Mar. 31, 2023

(87) PCT Pub. No.: WO2023/187577

PCT Pub. Date: Oct. 5, 2023

(65) Prior Publication Data

US 2025/0014002 A1 Jan. 9, 2025

(30) Foreign Application Priority Data

Mar. 31, 2022 (IN) ............................ 202221019661

(51) Int. Cl.

*G06Q 20/12* (2012.01)
*G06Q 20/36* (2012.01)
*G06Q 40/04* (2012.01)

(52) U.S. Cl.

CPC ......... *G06Q 20/123* (2013.01); *G06Q 20/367* (2013.01); *G06Q 40/04* (2013.01); *G06Q 2220/10* (2013.01)

(58) Field of Classification Search

None
See application file for complete search history.

(56) References Cited

U.S. PATENT DOCUMENTS 11,562,451 B1 * 1/2023 Kozlowski, III ....... G06F 16/27
11,972,415 B1 * 4/2024 Panes ................ G06Q 20/3678
(Continued)

FOREIGN PATENT DOCUMENTS

EP 3814967 A1 5/2021

OTHER PUBLICATIONS

International Search Report, PCT/IB2023/052929, mailed Jul. 7, 2023, Total pp. 03.

*Primary Examiner* — Chrystina E Zelaskiewicz
(74) *Attorney, Agent, or Firm* — FINNEGAN, HENDERSON, FARABOW, GARRETT & DUNNER LLP

(57) ABSTRACT

The present disclosure provides a system and a method for creating NFTs on a blockchain platform. The system facilitates creation of a first market, by an entity associated with a first computing device, for trading the NFTs. The system transmits a purchase request pertaining to the NFTs to one or more second computing devices associated with one or more users. Further, the system publishes a plurality of copies of the NFTs for a fixed price in the first market, and credits a sale proceed to a wallet of the entity based on a purchase event of the plurality of copies of the NFTs. The system updates a ledger of the blockchain platform with information of a current owner. Further, the system publishes the purchased plurality of copies of the NFTs in a second market for the fixed price for trading the purchased NFTs as fungible tokens.

18 Claims, 8 Drawing Sheets

(56) References Cited

U.S. PATENT DOCUMENTS

| | | | | |
|---|---|---|---|---|
| 2019/0197622 | A1 | 6/2019 | Molinari et al. | |
| 2021/0279305 | A1* | 9/2021 | Goldston ................ | G06F 16/41 |
| 2023/0073545 | A1* | 3/2023 | Kurian .................. | G06Q 20/02 |

* cited by examiner

SYSTEM AND METHOD FOR CREATING NON-FUNGIBLE TOKENS (NFTs) ON A BLOCKCHAIN PLATFORM

RESERVATION OF RIGHTS

A portion of the disclosure of this patent document contains material which is subject to intellectual property rights such as, but are not limited to, copyright, design, trademark, integrated circuit (IC) layout design, and/or trade dress protection, belonging to Jio Platforms Limited (JPL) or its affiliates (herein after referred as owner). The owner has no objection to the facsimile reproduction by anyone of the patent document or the patent disclosure, as it appears in the Patent and Trademark Office patent files or records, but otherwise reserves all rights whatsoever. All rights to such intellectual property are fully reserved by the owner.

FIELD OF INVENTION

The embodiments of the present disclosure generally relate to blockchain technology. More particularly, the present disclosure relates to a system and a method for creating Non-Fungible Tokens (NFTs) on a blockchain platform.

BACKGROUND OF THE INVENTION

The following description of the related art is intended to provide background information pertaining to the field of disclosure. This section may include certain aspects of the art that may be related to various features of the present disclosure. However, it should be appreciated that this section be used only to enhance the understanding of the reader with respect to the present disclosure, and not as admissions of prior art.

Fifth generation (5G)/sixth generation (6G) mobile and wireless networks provide enhanced mobile broadband communications and are intended to connect things everywhere while enabling new use cases. A 5G Radio Access Network (RAN) uses 5G radio Frequency Division Duplex (FDD) frequencies to provide wireless connectivity to devices to deliver incredible applications. In comparison to earlier available generations of mobile and wireless networks, the 5G architecture is service based. This implies that wherever required, architecture elements are defined as network functions that offer their services to other network functions via common framework interfaces. To support and continue this wide range of services and network functions across an ever-growing base of user equipment (UE), the 5G networks extend network slicing concept utilized in previous generation architectures. With respect to scope related to that of 5G mobile and wireless network architecture, a network slice includes a set of defined features and functionalities that together form a complete Public Land Mobile Network (PLMN) for providing services to UEs. The network slicing enables 5G networks to deploy multiple independent PLMNs, where each network slice is customized by instantiating only those features, capabilities, and services required satisfying a given subset of the UEs or a related business customer needs, for instance trading Non-Fungible Tokens (NFTs). A unique digital identifier popularly known as Non-Fungible Tokens (NFTs) that cannot be copied, substituted, or subdivided, is recorded in the blockchain, and is used to certify authenticity and ownership. However, managing and controlling resource allocation, resource monitoring, resource provisioning, and transactions recording for resources across each network slice is a challenge in the 5G/6G mobile and wireless networks, especially for supporting NFTs.

There is, therefore, a need in the art to provide an improved system and method to overcome the above-mentioned shortcomings.

OBJECTS OF THE PRESENT DISCLOSURE

Some of the objects of the present disclosure, which at least one embodiment herein satisfies are as listed herein below.

It is an object of the present disclosure to support Non-Fungible Tokens (NFTs) on a private blockchain platform which is a highly scalable.

It is an object of the present disclosure to provide support for maintaining NFTs on blockchain platforms by creating fractional fungible tokens to be used for sharing an NFT asset.

It is an object of the present disclosure to evolve cryptocurrency space, in which the NFTs are virtual digital currencies whose identity, authenticity, and traceability are tamper-proof.

It is an object of the present disclosure to provide NFTs that are unique and hence cannot be replicated in any case, and are widely popular for selling digital collectibles.

It is an object of the present disclosure to provide support for maintaining NFTs on a permissioned private blockchain platform with fractional ownership.

It is an object of the present disclosure to provide support for fungible sharing of the NFTs on a blockchain platform.

It is an object of the present disclosure to provide an effective utilization of the blockchain-based system to record both trade and post-trade information.

It is an object of the present disclosure to provide a blockchain-based system where valid users can securely register and perform trading.

It is an object of the present disclosure to provide a blockchain platform where authentic user registration will be performed so that fraudulent users are denied participation in a bidding event.

It is an object of the present disclosure to provide a blockchain-based system that is completely transparent and has a trusted environment.

SUMMARY

This section is provided to introduce certain objects and aspects of the present disclosure in a simplified form that are further described below in the detailed description. This summary is not intended to identify the key features or the scope of the claimed subject matter.

In an aspect, the present disclosure provides a system for creating Non-Fungible Tokens (NFTs) on a blockchain platform. The system may include one or more processors coupled with a memory. The memory may store instructions which when executed by the one or more processors causes the system to create, by an entity using a first computing device, a first market for trading the NFTs. The NFTs may be stored along with information pertaining to the entity in a ledger of the blockchain platform. The system may be configured to transmit a purchase request pertaining to the NFTs to one or more second computing devices associated with one or more users. Further, a plurality of copies of NFTs may be published in the first market by the entity for a fixed price. The each of the plurality of copies of the NFTs is associated with a respective sequence number. The system may be configured to credit a sale proceed to a wallet of the entity based on a purchase event of the plurality of copies of the NFTs by a current owner, and update the ledger with information of the current owner of the purchased plurality of copies of the NFTs. Finally, the system may be configured to publish the purchased plurality of copies of the NFTs by the current owner in a second market for the fixed price for trading the purchased NFTs as fungible tokens.

In an embodiment, the NFT may include at least one of a utility asset, an investment asset, and unique digital items including, but not limited to, a media file, a video, an audio, an image, an art, and others.

In an embodiment, the system may be configured to initiate a registration process for admitting the entity by an administrator of the blockchain platform. The registration process may include, but not limited to, at least one of verification and validation of Know Your Customer (KYC) documents, collection of initial deposit amount, assignment of membership license, set up of payment gateway, assignment of a super administrator for the entity, and others.

In an embodiment, the system may be configured to initiate an enrolling process of the one or more users based on an input from the entity. The enrolling process may include, but not limited to, at least one of collection of Know Your Customer (KYC) details, linking of bank account, Unified Payments Interface (UPI), and cryptocurrency, and collection of initial joining fee, and others.

In an embodiment, the system may be configured to compute a first set of revenue streams for the entity, where the first set of revenue stream may include, but not limited to, at least one of a joining fee, a membership fee, the sale proceed of the second market, a transaction fee, and others.

In an embodiment, the system may be configured to compute a second set of revenue stream for the one or more users. The second set of revenue stream may include at least one of the NFTs obtained from the sale proceed of the second market, the fungible tokens obtained from the sale proceed of the second market, and an advertisement pay-per-click (PPC) revenue or standard revenue.

In an embodiment, a range of the sequence number is indirectly proportional to a value of an NFT the plurality of copies of the NFTs.

In an embodiment, the system may be configured to manage one or more functional features pertaining to services associated with the NFTs. The one or more functional features may include, but not limited to, at least one of an ownership provenance, royalties, exchanges, transfer of value, asset protection, counter measure, and others.

In an embodiment, the entity may include one of a business organization, a manufacturer, a government organization, a trade organization or others.

In an aspect, the present disclosure provides a User Equipment (UE) for trading a Non-Fungible Tokens (NFTs) on a blockchain platform. The UE includes one or more processors coupled with a memory. The memory may store instructions which when executed by the one or more processors causes the UE to receive a purchase request pertaining to a plurality of copies of the NFTs, and select the plurality of copies of the NFTs displayed on a virtual auction in a first market for a fixed price. Further, the UE may be configured to purchase the selected plurality of copies of the NFTs from the first market for the fixed price, where each of the plurality of copies of the NFTs is associated with a respective sequence number. Finally, the UE may be configured to transmit a response pertaining to the purchased plurality of copies of the NFTs, for displaying the purchased NFT on the virtual auction in a second market.

In an aspect, the present disclosure provides a method for creating Non-Fungible Tokens (NFTs) on a blockchain platform. The method may include the step of creating by an entity using a first computing device via a system, a first market for trading the NFTs. The NFTs are stored along with information pertaining to the entity in a ledger in the blockchain platform. The method may include the step of transmitting, by the system, a purchase request pertaining to the NFTs to one or more second computing devices associated with one or more users. The method may include the step of publishing, by the entity via the system, a plurality of copies of the NFTs in the first market for a fixed price. The each of the plurality of copies of the NFTs is associated with a respective sequence number. The method may include the step of crediting, by the system, a sale proceed to a wallet of the entity based on a purchase event of the plurality of copies of the NFTs by the one or more users. Further, the method may include updating the ledger with the information of a current owner of the purchased plurality of copies of the NFTs. Finally, the method may include the step of publishing, by the current owner via the system, the purchased plurality of copies of the NFTs in a second market for the fixed price for trading the purchased NFT as fungible tokens.

In an aspect, the present disclosure relates to a non-transitory computer readable medium including processor-executable instructions that cause a processor to create, by an entity using a first computing device, a first market for trading Non-Fungible Tokens (NFTs), wherein the NFTs are stored along with information pertaining to the entity in a ledger of a blockchain platform, transmit a purchase request pertaining to the NFTs to one or more second computing devices associated with one or more users, publish, by the entity, a plurality of copies of the NFTs in the first market for a fixed price, wherein the each of the plurality of copies of the NFTs is associated with a respective sequence number, credit a sale proceed to a wallet of the entity based on a purchase event of the plurality of copies of the NFTs by the one or more users, and update the ledger with the information of a current owner of the purchased plurality of copies of the NFTs, and publish, by the current owner, the purchased plurality of copies of the NFTs in a second market for the fixed price for trading the purchased NFTs as fungible tokens.

BRIEF DESCRIPTION OF THE DRAWINGS

The accompanying drawings, which are incorporated herein, and constitute a part of this invention, illustrate exemplary embodiments of the disclosed methods and systems in which like reference numerals refer to the same parts throughout the different drawings. Components in the drawings are not necessarily to scale, emphasis instead being placed upon clearly illustrating the principles of the present invention. Some drawings may indicate the components using block diagrams and may not represent the internal circuitry of each component. It will be appreciated by those skilled in the art that invention of such drawings includes the invention of electrical components, electronic components or circuitry commonly used to implement such components.

The foregoing shall be more apparent from the following more detailed description of the disclosure.

DETAILED DESCRIPTION

In the following description, for the purposes of explanation, various specific details are set forth in order to provide a thorough understanding of embodiments of the present disclosure. It will be apparent, however, that embodiments of the present disclosure may be practiced without these specific details. Several features described hereafter can each be used independently of one another or with any combination of other features. An individual feature may not address all of the problems discussed above or might address only some of the problems discussed above. Some of the problems discussed above might not be fully addressed by any of the features described herein.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the invention as set forth.

The present disclosure relates to a method and a system for providing a bidding platform, and more particularly, to a method and a system for providing the bidding platform based on blockchain technology to record trade and post trade information.

Figure 1:
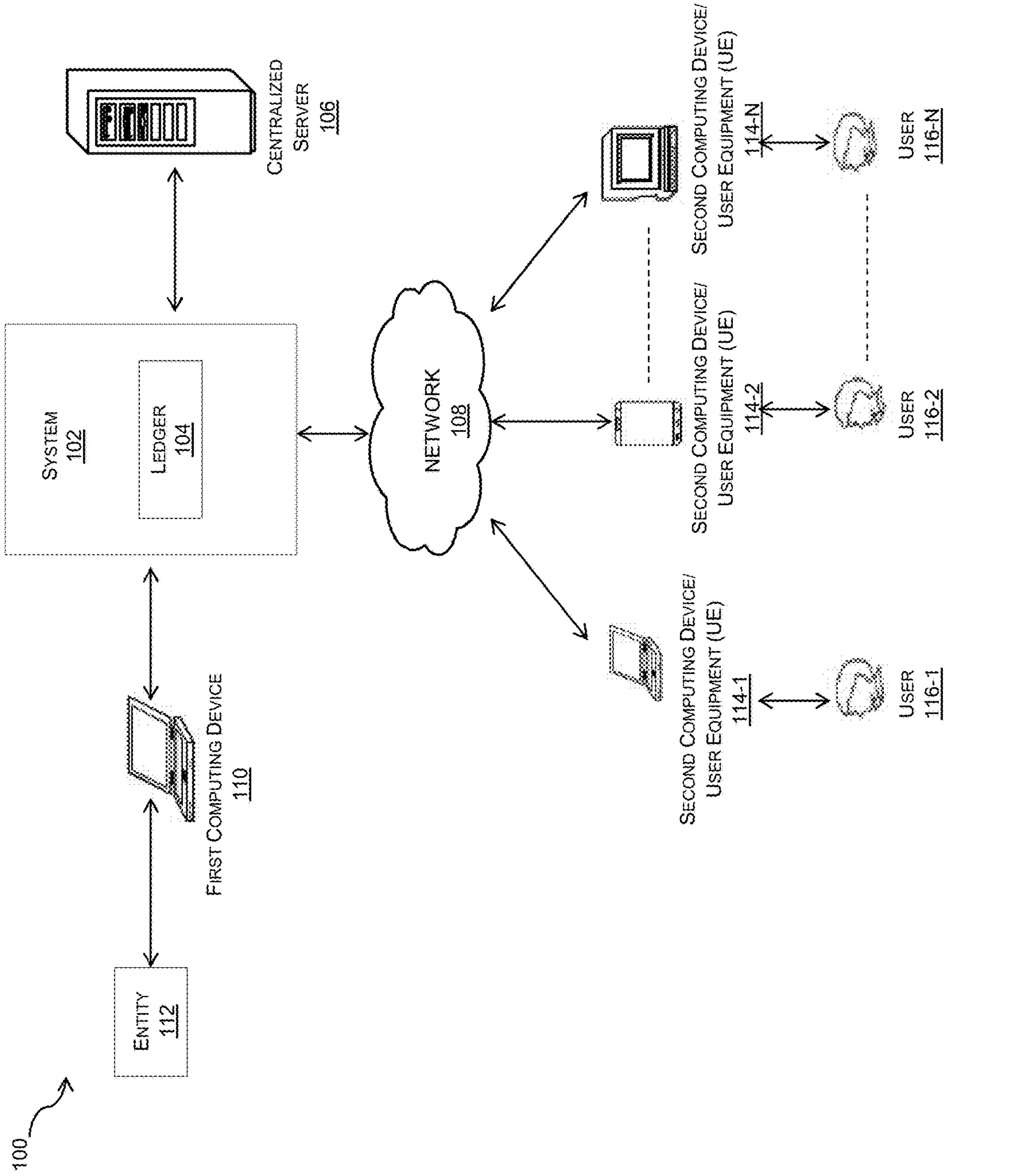
FIG. 1 illustrates an exemplary network architecture in which or with which a proposed system of the present disclosure may be implemented, in accordance with an embodiment of the present disclosure.

FIG. 1 illustrates an exemplary network architecture (100) in which or with which proposed system of the present disclosure may be implemented, in accordance with an embodiment of the present disclosure.

Referring to FIG. 1, the network architecture (100) may include the proposed system (102) with which or in which Non-Fungible Tokens (NFTs) are created on a blockchain platform. The system (102) may be associated with an entity (112) that uploads the NFTs using a first computing device (110). The system (102) may be further associated with one or more second computing devices (114-1, 114-2 . . . 114-N) (collectively referred as second computing devices (114) and individually as second computing device (114) or user equipment (114)) through a network (108). The second computing devices (114) may be associated with one or more users (116-1, 116-2 . . . 116-N).

In an example embodiment, the network (108) may include, by way of example but not limitation, at least a portion of one or more networks having one or more nodes that transmit, receive, forward, generate, buffer, store, route, switch, process, or a combination thereof, etc. one or more messages, packets, signals, waves, voltage or current levels, some combination thereof, or so forth. The network (108) may include, by way of example but not limitation, one or more of: a wireless network, a wired network, an internet, an intranet, a public network, a private network, a packet-switched network, a circuit-switched network, an ad hoc network, an infrastructure network, a Public-Switched Telephone Network (PSTN), a cable network, a cellular network, a satellite network, a fiber optic network, some combination thereof.

In another example embodiment, the first (110) and/or the second computing devices (114) may include, but not be limited to, a handheld wireless communication device (e.g., a mobile phone, a smart phone, a phablet device, and so on), a wearable computer device (e.g., a head-mounted display computer device, a head-mounted camera device, a wristwatch computer device, and so on), a Global Positioning System (GPS) device, a laptop computer, a tablet computer, or another type of portable computer, a media playing device, a portable gaming system, and/or any other type of computer device with wireless communication capabilities, and the like. In an embodiment, the first (110) and/or second computing devices (114) may communicate with the system (102) via set of executable instructions residing on any operating system. In an embodiment, the first (110) and/or second computing devices (114) may include, but are not limited to, any electrical, electronic, electro-mechanical or an equipment or a combination of one or more of the above devices such as virtual reality (VR) devices, augmented reality (AR) devices, laptop, a general-purpose computer, desktop, personal digital assistant, tablet computer, mainframe computer, or any other computing device, wherein the computing device may include one or more in-built or externally coupled accessories including, but not limited to, a visual aid device such as camera, audio aid, a microphone, a keyboard, input devices for receiving input such as touch pad, touch enabled screen, electronic pen and the like.

It may be appreciated that the first (110) and/or second computing devices (114) may not be restricted to the mentioned devices and various other devices may be used.

Referring to FIG. 1, the first (110) and the second computing devices (114) may be communicatively coupled to at least a server (106) through the network (108). A plurality of copies of the NFTs are published by the entity (112) using the first computing device (110) in the first market for a fixed price. The purchased plurality of copies of the NFTs are published by a current owner using second computing device (114) in the second market for the fixed price for trading the purchased NFTs as fungible tokens. Further, the exemplary architecture (100) includes a ledger (104) associated with the system (102) for facilitating storing the NFTs along with information pertaining to the entity (112) and the current owner in the blockchain platform.

In an example embodiment, the entity (112) may include, but not be limited to, any business organisation, banking organisations, trading organisations, government organisations, finance organisations, university funding centres, and the like.

In an example embodiment, the one or more users (116) (also known as "collector/fans") may include, but not be limited to, buyers, bidders, sellers, vendors, retailers, suppliers, traders, stockers, and the like.

In an embodiment, the NFTs may include, but not be limited to, a utility asset, an investment asset, and unique digital items. The unique digital items may include, but not be limited to, fractional shared ownership, monetization through digital media/advertisements, usage in virtual worlds, number of views, media file, video, audio, image, art, and others. In the blockchain world, NFTs have emerged as the artifact of choice to represent assets, utility, or a claim on something inherent to a specific blockchain project, thus tokens exist due to their usefulness of representing something digitally and also assure legal status to the owners of those tokens. The utility asset is with respect to user's point of view, and the investment asset is with respect to investor's point of view. The uploaded NFTs are stored and tracked on the ledger (104) of the blockchain, which enables trading transactions between the entity (112) and the one or more users (116) with clear proof of ownership.

In another embodiment, the present disclosure may include the blockchain platform for trading the NFTs (also referred as moments/collectables). A person skilled in the art will appreciate that the terms "NFTs," "moments," and "collectables" may be used interchangeably throughout the disclosure. The moments/collectables which are generally rare, sought-after items are often acquired for their investment value. The NFTs/moments/collectables may be in the form of media files, for example, videos, audio, image, and art, which are traded Over-The-Counter (OTC). Further, the moments may be resold by asset owners. For example, with respect to sports analogy, when traders are die-hard fans of a particular player, in that case, the traded articles may either be a short video or image of crucial moments in the match. Any unique digital item that is regarded as being of value or interest may be assigned to a collector. The licensed collectables may be based on intellectual properties such as, but not limited to, images, characters, logos from sports, music, movies, television, video games, and others. A large subsection of licensing may include, but not be limited to, advertisements, brand name, character collectibles, and others.

As an example, a rookie card may be a trading card that is first to feature an athlete who has participated in a highest level of competition within his or her sport. The one or more users/collectors may value these first appearances more than subsequent card issues.

Referring to FIG. 1, the system (102) may initiate a registration process for admitting the entity (112) by an administrator (with reference to FIG. 4) of the blockchain platform. The blockchain platform can be either in public or private or hierarchical fashion, with the blockchain platform leveraging smart contracts for trading digital signatures, NFTs for transactions related to ownership transfers, capture events related to monetization, or the like. The registration process may include, but not limited to, at least one of verification and validation of Know Your Customer (KYC) documents, collection of initial deposit amount, assignment of membership license, set up of payment gateway, assignment of a super administrator for the entity, and others. Once the registration process is completed, the entity (112) may be successfully registered on the blockchain platform for trading the NFTs. In an embodiment, the system (102) may receive the NFTs from the entity (112) using the first computing device (110), and the system (102) may upload the received NFTs to the ledger (104). The ledger (104) facilitates storing the NFTs along with information pertaining to the entity (112) in the blockchain platform.

In an embodiment, the entity (112) may initiate an enrolling process of the one or more users (116) associated with the second computing devices (114). The enrolling process may include, but not be limited to, at least one of collection of KYC details, linking of bank account, Unified Payments Interface (UPI), and cryptocurrency, collection of initial joining fee, and others.

In an embodiment, the system (102) may compute a first set of revenue stream for the entity (112). The first set of revenue stream may include, but not be limited to, at least one of a joining fee, a membership fee, the sale proceed of the second market, a transaction fee, and others.

In an embodiment, the system (102) may compute a second set of revenue stream for the one or more users (116). The second set of revenue stream may include, but not be limited to, at least one of the NFTs obtained from the sale proceed of the second market, the fungible tokens obtained from the sale proceed of the second market, and an advertisement pay-per-click (PPC) revenue or standard revenue.

In an embodiment, the system (102) may compute future revenue streams including stretch goal of the application. For instance, for player based games, revenue streams may be, for example, a Virtual Reality Video Mode, an Artificial Intelligence Based—Virtual Team Formation and Trainings, or the like.

In an embodiment, the system (102) may create a first market for trading the NFTs uploaded by the entity (112) using the first computing device (110). The system (102) may transmit a purchase request pertaining to the NFTs to the one or more users (116) associated with the one or more second computing devices (114). Further, the NFTs may be displayed on a virtual auction in the first market for a fixed price by the entity (112), where each of the plurality of copies of the NFTs is associated with a respective sequence number. A range of the sequence number is indirectly proportional to a value of the NFT. For example, sequence 1 may be priced at 1000$ and sequence 2 may be priced at 850$ and so on. The one or more users (116) may participate in the bidding process for purchasing the NFTs listed on the virtual auction. The system (102) may credit a sale proceed to a wallet of the entity (112) based on a purchase event of the plurality of copies of the NFTs by the one or more users (116) associated with the one or more second computing devices (114). The sale proceed is summation of series of sequences. For example, Sale Proceed=Σ(SP.Seq 1+SP.Seq 2+SP.Seq 3+ . . . n). Further, the ledger (104) may be updated with information of a current owner of the purchased NFTs. Finally, the system (102) may display or publish the purchased NFTs in a second market by the current owner for the fixed price to the one or more users (116) for trading the purchased NFTs as fungible tokens.

In another exemplary embodiment, the server (106) may include or comprise, by way of example but not limitation, one or more of a stand-alone server, a server blade, a server rack, a bank of servers, a server farm, hardware supporting a part of a cloud service or system, a home server, hardware running a virtualized server, one or more processors executing code to function as a server, one or more machines performing server-side functionality as described herein, at least a portion of any of the above, some combination thereof.

Although FIG. 1 shows exemplary components of the network architecture (100), in other embodiments, the network architecture (100) may include fewer components, different components, differently arranged components, or additional functional components than depicted in FIG. 1. Additionally, or alternatively, one or more components of the network architecture (100) may perform functions described as being performed by one or more other components of the network architecture (100).

Figure 2A:
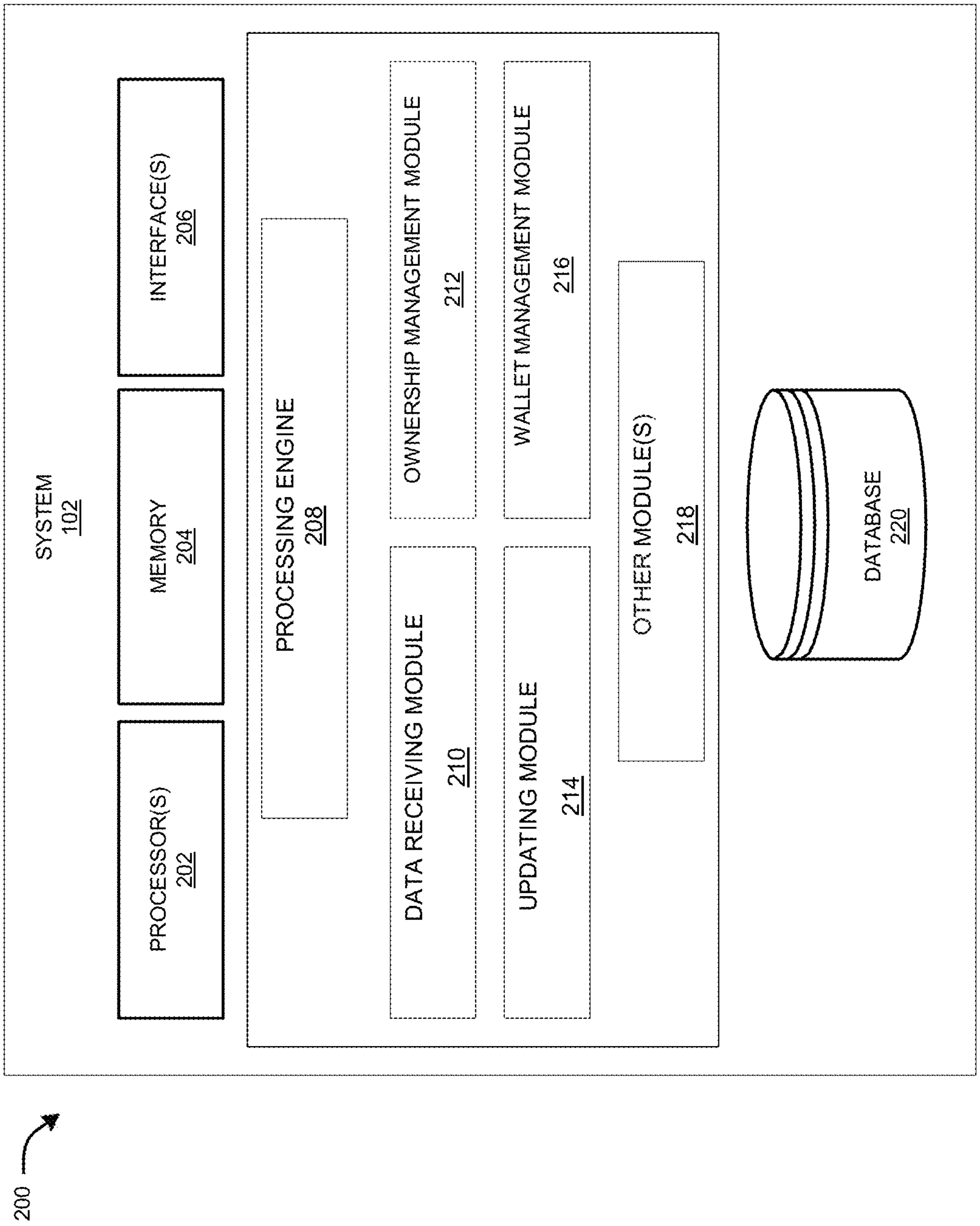
FIG. 2A illustrates an exemplary block diagram of the proposed system, in accordance with an embodiment of the present disclosure.

FIG. 2A illustrates an exemplary block diagram (200) of the proposed system (102) for creating NFTs on a blockchain platform, in accordance with an embodiment of the present disclosure.

As illustrated, the system (102) may include one or more processors (202) which may be implemented as one or more microprocessors, microcomputers, microcontrollers, digital signal processors, central processing units, logic circuitries, and/or any devices that manipulate data based on operational instructions. Among other capabilities, the one or more processor(s) (202) may be configured to fetch and execute computer-readable instructions stored in a memory (204). The memory (204) may store one or more computer-readable instructions or routines, which may be fetched and executed to create or share the data units over a network service. The memory (204) may comprise any non-transitory storage device including, for example, volatile memory such as Read Only Memory (RAM), or non-volatile memory such as Erasable Programmable Read-Only Memory (EPROM), flash memory, and the like.

In an embodiment, the one or more processors (202) may be implemented as a combination of hardware and programming (for example, programmable instructions) to implement one or more functionalities of the one or more processors (202). In examples described herein, such combinations of hardware and programming may be implemented in several different ways. For example, the programming for the one or more processors (202) may be processor-executable instructions stored on a non-transitory machine-readable storage medium and the hardware for the one or more processors (202) may comprise a processing resource (for example, one or more processors), to execute such instructions. In the present examples, the machine-readable storage medium may store instructions that, when executed by the processing resource, implement the one or more processors (202). In such examples, the system (102) may comprise the machine-readable storage medium storing the instructions and the processing resource to execute the instructions, or the machine-readable storage medium may be separate but accessible to the system (102) and the processing resource. In other examples, the one or more processors (202) may be implemented by electronic circuitry.

In an embodiment, the system (102) may comprise an interface(s) (206). The interface(s) (206) may comprise a variety of interfaces, for example, interfaces for data input and output devices, referred to as I/O devices, storage devices, sensors and the like. The interface(s) (206) may facilitate communication of the system (102) with various devices coupled to it. The interface(s) (206) may also provide a communication pathway for one or more components of the system (102). Examples of such components include, but are not limited to, processing engine(s) (208) and database (220).

In an embodiment, the database (220) may comprise data that may be either stored or generated as a result of functionalities implemented by any of the components of the processor (202) and/or the processing engines (208).

In an exemplary embodiment, the processing engine(s) (208) of the system (102) may include, a data receiving module (210), an ownership management module (212), an updating module (214), a wallet management module (216), and other engines (218), wherein the other engines (218) may include, without limitation, storage engine, computing engine, or signal generation engine.

In an embodiment, the data receiving module (210) may receive data packets from the entity (112) pertaining to the NFTs in order to create a first market for trading the NFTs with the one or more users (116). For instance, the data packets may include, but not be limited to, information pertaining to the entity (112) and the list of NFTs to be uploaded. In an embodiment, the data packets may include NFTs/moments/collectables that are in the form of media files (for example, videos, audio, image, art) which are used for trading.

In an embodiment, the ownership management module (212) may enable management and transfer of ownership pertaining to the purchased NFTs. For instance, the user (116-1) sells an NFT 1 to the user (116-2) in the first/second market.

In an embodiment, the updating module (214) may update the ledger (104) with information after every transaction of the NFTs. For instance, the registration process is completed and the entity (112) is successfully registered on the blockchain platform for trading the NFTs. Thus, the ledger (104) is updated with the information related to the each and every entity (112) and the information associated with the entity (112) which facilitates trading NFTs.

In an embodiment, the wallet management module (216) may enable management of the user's wallet which includes a credit value for every sale of the NFTs, and a debit value for purchase of the NFTs. For instance, an entity (112) sells an NFT 1 to the user (116-1) in the first/primary market. The user (116-1) buys the NFT 1 from the entity (112) for 1000$.

Figure 2B:
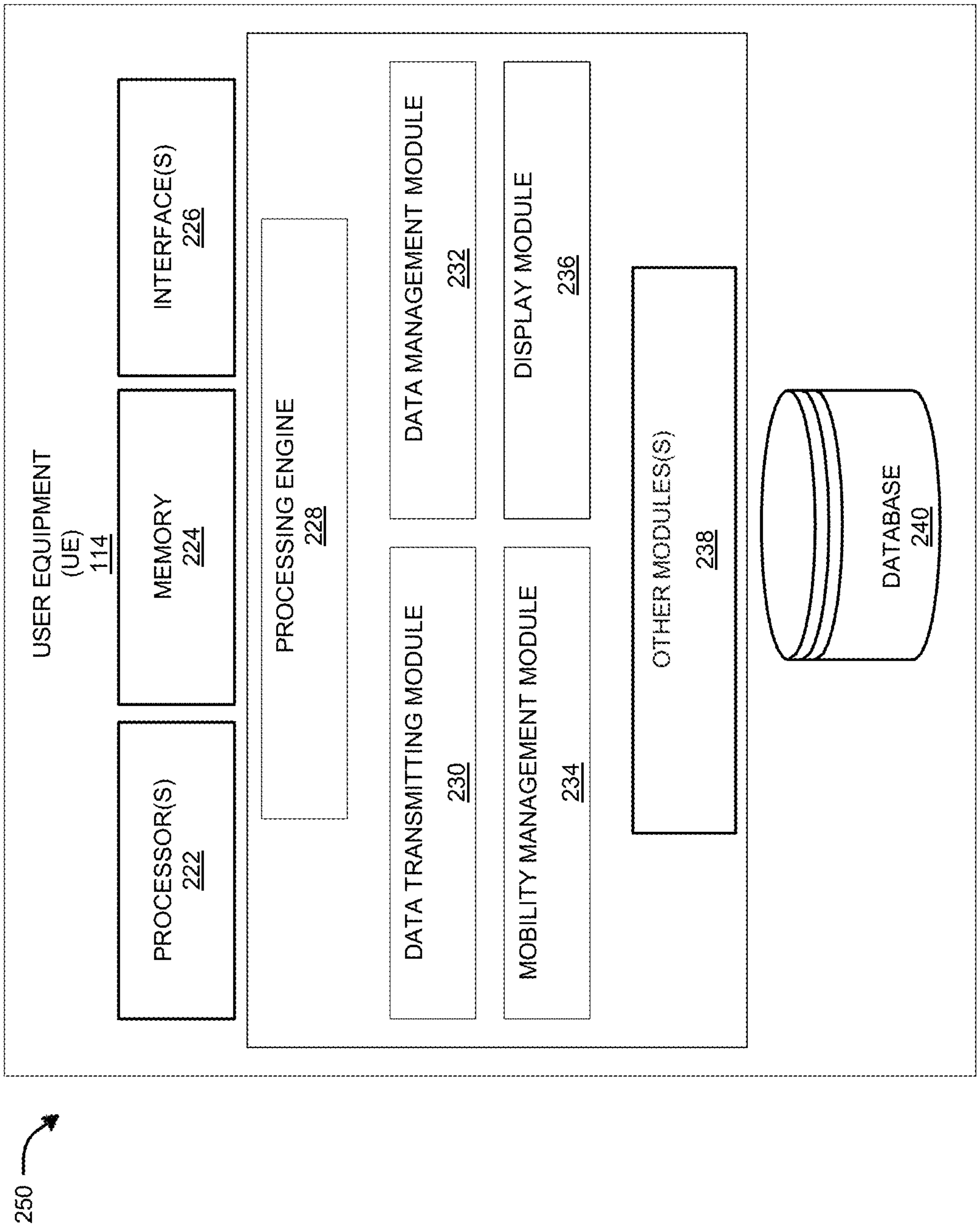
FIG. 2B illustrates an exemplary block diagram of a user equipment (UE) for trading Non-Fungible Tokens (NFTs) on a blockchain platform, in accordance with an embodiment of the present disclosure.

FIG. 2B illustrates an exemplary block diagram (250) of a user equipment (UE) (114) for trading NFTs on a blockchain platform, in accordance with an embodiment of the present disclosure.

Referring to FIG. 2B, the UE (114) may comprise a processor (222). The processor (222) may be an edge-based processor but not limited to it. The processor (222) may be implemented as one or more microprocessors, microcomputers, microcontrollers, digital signal processors, central processing units, logic circuitries, and/or any devices that process data based on operational instructions. Among other capabilities, the processor(s) (222) may be configured to fetch and execute computer-readable instructions stored in a memory (224) of the UE (114). The memory (224) may be configured to store one or more computer-readable instructions or routines in a non-transitory computer readable storage medium, which may be fetched and executed to create or share data packets over a network service. The memory (224) may comprise any non-transitory storage device including, for example, volatile memory such as RAM, or non-volatile memory such as EPROM, flash memory, and the like.

In an embodiment, the UE (114) may include an interface (s) (226). The interface(s) (226) may comprise a variety of interfaces, for example, interfaces for data input and output devices, referred to as I/O devices, storage devices, and the like. The interface(s) (226) may facilitate communication through the UE (114). Further components of the UE (114) include, but are not limited to, processing engine(s) (228) and a database (240).

The processing engine(s) (228) may be implemented as a combination of hardware and programming (for example, programmable instructions) to implement one or more functionalities of the processing engine(s) (228). In examples described herein, such combinations of hardware and programming may be implemented in several different ways. For example, the programming for the processing engine(s) (228) may be processor-executable instructions stored on a non-transitory machine-readable storage medium and the hardware for the processing engine(s) (228) may comprise a processing resource (for example, one or more processors), to execute such instructions. In the present examples, the machine-readable storage medium may store instructions that, when executed by the processing resource, implement the processing engine(s) (228). In such examples, the UE (114) may comprise the machine-readable storage medium storing the instructions and the processing resource to execute the instructions, or the machine-readable storage medium may be separate but accessible to the UE (114) and the processing resource. In other examples, the processing engine(s) (228) may be implemented by electronic circuitry.

In an embodiment, the database (240) may comprise data that may be either stored or generated as a result of functionalities implemented by any of the components of the processor (222) and/or the processing engines (228).

In an exemplary embodiment, the processing engine(s) (228) may include, a data transmitting module (230), a data management module (232), a mobility management module (234), a display module (236) and other engines (238) wherein the other engines (238) may further include, without limitation, storage engine, computing engine, or signal generation engine.

In an embodiment, the data transmitting module (230) may enable the transfer of the data packets in the form of response from the UE (114) to the system (102) over a point-to-point or point-to-multipoint communication channel. For instance, the data packets may include information pertaining to the current owner and the purchased list of NFTs. In an embodiment, the data management module (232) may involve the collection, storage, analysis, and sharing of data which is received via the network (108). The UE (114) may be configured to manage the data received from the system (102), where the data may include metadata associated with the step of purchasing the NFTs, ownership information, and the like.

In an embodiment, the mobility management module (234) may enable tracking various activities such as the registration process, enrolling process, and others.

In an embodiment, the display module (236) may enable presentation of information to one or more users (116).

Although FIGS. 2A and 2B show exemplary components of the system (102) and the UE (114), respectively, in other embodiments, the system (102) and/0r the UE (114) may include fewer components, different components, differently arranged components, or additional functional components than depicted in FIGS. 2A and 2B.

Figure 3:
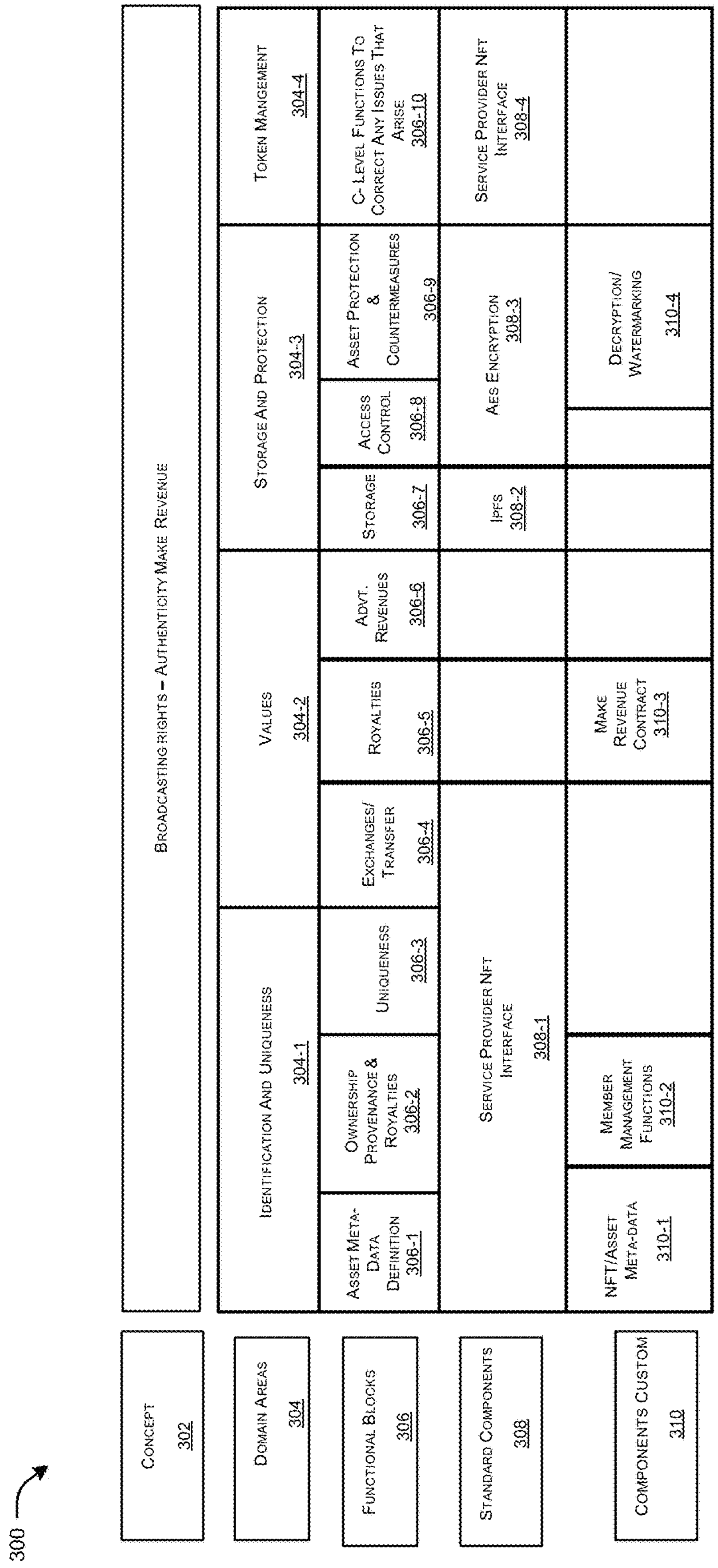
FIG. 3 illustrates an exemplary composition representation for Over-the-Counter (OTC) implementation, in accordance with an embodiment of the present disclosure.

FIG. 3 illustrates an exemplary composition representation (300) for Over-the-Counter (OTC) implementation, in accordance with an embodiment of the present disclosure.

With respect to FIG. 3, various core concepts (302) with respect to the OTC implementation are defined that may include a plurality of domain areas (304), a plurality of functional blocks (306), a plurality of standard components (308), and a plurality of custom components (310).

In an embodiment, the plurality of domain areas (304) may include, but not limited be to, an identification and uniqueness domain (304-1), a value domain (304-2), a storage and protection domain (304-3), and a token management domain (304-4).

In an embodiment, the plurality of functional blocks (306) of the identification and uniqueness domain (304-1) may include, but not be limited to, asset meta-data definition (306-1), ownership provenance and royalties (306-2), and uniqueness (306-3). The plurality of functional blocks (306) of the value domain (304-2) may include, but not be limited to, exchanges/transfer (306-4), royalties (306-5), and advertisement revenues (306-6). Further, the plurality of functional blocks (306) of the storage and protection domain (304-3) may include, but not be limited to, storage (306-7), access control (306-8), and asset protection and counter measures (306-9). The plurality of functional blocks (306) of the token management domain (304-4) may include, but not be limited to, C-level functions to correct any issues that may arise (306-10).

In an embodiment, the plurality of standard components (308) may include, but not be limited to, a service provider NFT interface (308-1), an Inter-Planetary File System (IPFS) (308-2), an Advanced Encryption Standard (AES) encryption (308-3), and service provider NFT interface (308-4).

In an embodiment, the plurality of custom components (310) may include, but not be limited to, NFTs/asset meta-data (310-1), member management functions (310-2), make revenue contract (310-3), and decryption/watermarking (310-4).

Although FIG. 3 shows exemplary components, in other embodiments, the representation (300) may include fewer components, different components, differently arranged components, or additional functional components than depicted in FIG. 3.

Figure 4:
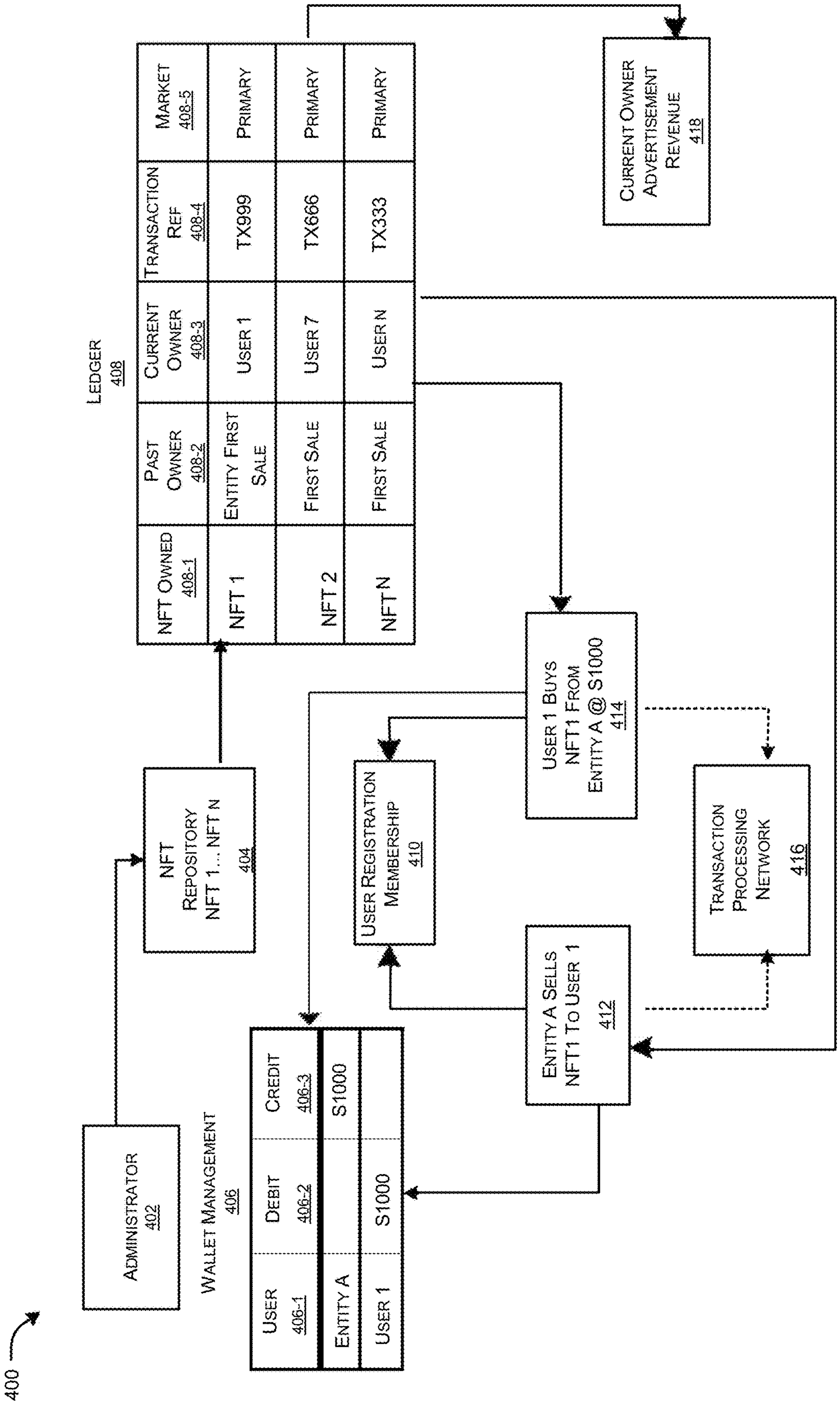
FIG. 4 illustrates an exemplary workflow representation for a primary market, in accordance with an embodiment of the present disclosure.

FIG. 4 illustrates an exemplary workflow representation (400) for a primary market, in accordance with an embodiment of the present disclosure.

With reference to FIG. 4, an administrator (402) may be connected to a ledger (408) which includes the NFTs repository (404). A person skilled in the art will understand that the ledger (408) may be similar to the ledger (104) of FIG. 1 in its functionality, and hence, may not be described again in detail for the sake of brevity.

Referring to FIG. 4, the NFTs repository (404) may include a series of NTFs ($NFT_1$ . . . . $NFT_N$) which are uploaded by the entity (112). The ledger (408) includes various attributes such as NFTs owned (408-1), a past owner (408-2), a current owner (408-3), a transaction reference (408-4), a market (408-5). The administrator (402) may be authorized to manage the aspects of selling and buying of NFTs through a wallet management (406) which includes a user list (406-1), a debit list (406-2), and a credit list (406-3). For instance, the user list (406-1) includes the entity (112) and/or the one or more users (116) who have been involved in NFTs transaction. The debit list (406-2) and the credit list (406-3) pertains to the purchase value and the sale value of NFTs. A person skilled in the art will appreciate that the wallet management module (406) may be similar to the wallet management module (216) of FIG. 2A in its functionality.

In an embodiment, once the registration process is completed and the entity (112) is successfully registered on the blockchain platform for trading the NFTs, the entity creates the first market and uploads NFTs. At block 412, an entity A sells an NFT 1 to a user 1 in the primary market. At block 414, the user 1 buys the NFT 1 from the entity A for 1000$ by recording the transaction at a transaction processing network (416). Simultaneously, the NFTs transactions will be updated in the wallet management (406) and the ledger (408). In addition, a current owner advertisement revenue (418) generates the advertisement revenues pertaining to the current owner.

Figure 5:
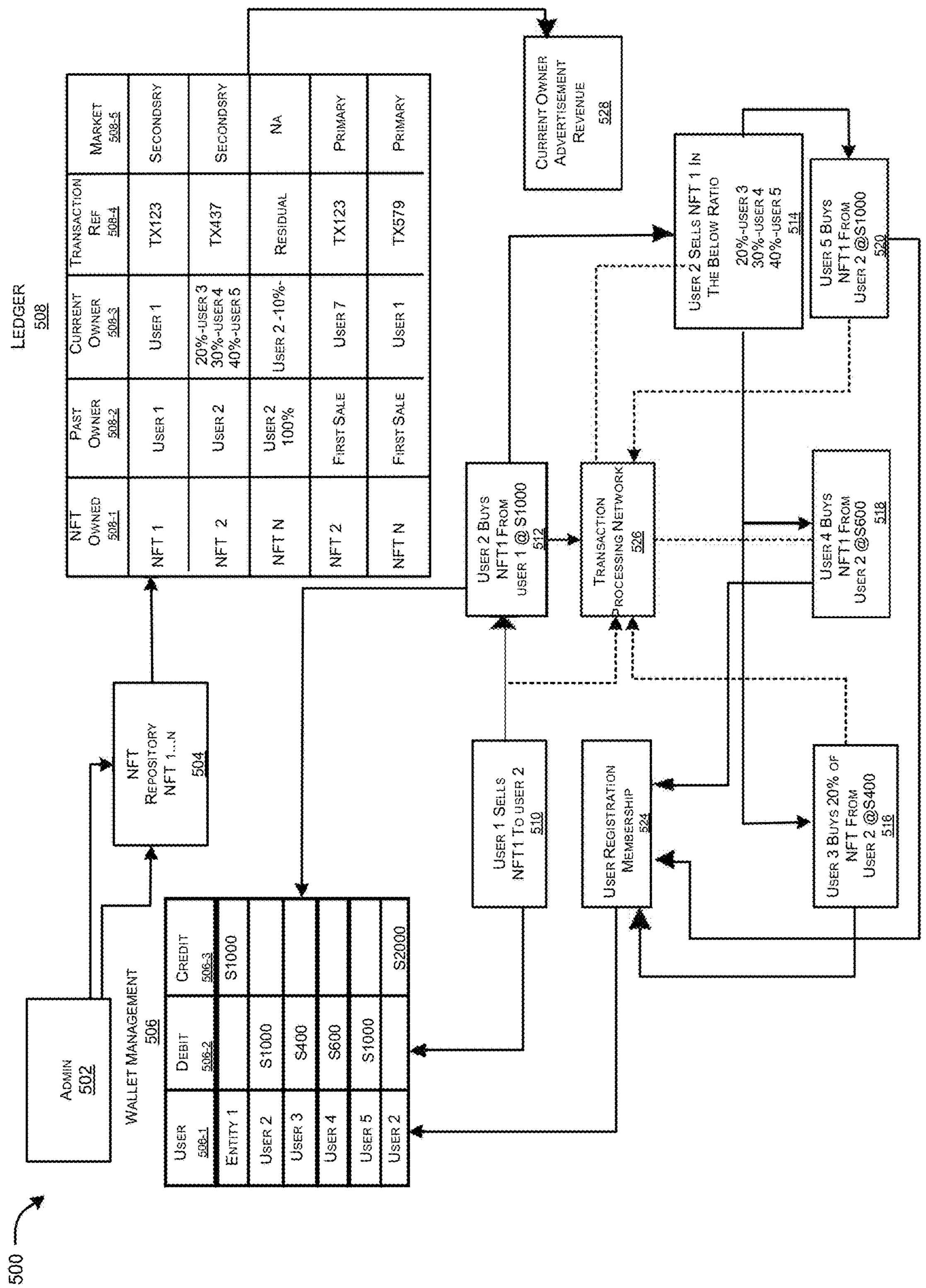
FIG. 5 illustrates an exemplary workflow representation for a secondary market, in accordance with an embodiment of the present disclosure.

FIG. 5 illustrates an exemplary workflow representation (500) for a secondary market, in accordance with an embodiment of the present disclosure.

With reference to FIG. 5, an administrator (502) may be connected to the ledger (508) which includes the NFTs repository (504). A person skilled in the art will understand that the ledger (508) may be similar to the ledger (104) of FIG. 1 and/or the ledger (408) of FIG. 4 in its functionality, and hence, may not be described in detail again for the sake of brevity. Similarly, the NFTs repository (504) may be similar to the NFTs repository of FIG. 4 in its functionality, and hence, may not be described in detail again for the sake of brevity.

Referring to FIG. 5, the NFTs repository (504) may include a series of NTFs ($NFT_1$ . . . . $NFT_N$) which are uploaded by the entity (112). The ledger (508) includes various attributes such as NFT owned (508-1), a past owner (508-2), a current owner (508-3), a transaction reference (508-4), and a market (508-5). The administrator (502) may be authorized to manage the aspects of selling and buying of NFT through a wallet management (506) which includes a user list (506-1), a debit list (506-2), and a credit list (506-3). For instance, the user list (506-1) includes the entity (112) and/or the one or more users (116) who have been involved in NFTs transaction. The debit list (506-2) and the credit list (506-3) pertains to the purchase value and the sale value of NFTs. A person skilled in the art will understand that the wallet management module (506) may be similar to the wallet management module (216) of FIG. 2A and the wallet management module (406) of FIG. 4 in its functionality, and hence, may not be described in detail again for the sake of brevity.

In an embodiment, at block 510, the user 1 sells an NFT 1 to a user 2 in the secondary market. At block 512, the user 2 buys the NFT 1 from the user 1 for 1000$. Further, at block 514, the user 2 sells an NFT 1 to multiple users in different proportion of purchased NFT 1, such as a user 3—20% of NFT 1, a user 4—30% of NFT 1, and a user 5—40% of NFT 1. At block 516, the user 3 buys 20% of NFT 1 from user 2 for 400$. At block 518, the user 4 buys 30% of NFT 1 from user 2 for 600$. At block 520, the user 5 buys 40% of NFT 1 from user 2 for 1000$. The transactions are recorded by a transaction processing network (526). Further, the identity of the user is authenticated/verified by using a user registration membership (524) prior to buying or selling the NFTs. Simultaneously, the NFT transactions will be updated in the wallet management (506) and the ledger (508). In addition, a current owner advertisement revenue (528) generates the advertisement revenues pertaining to the current owner.

Figure 6:
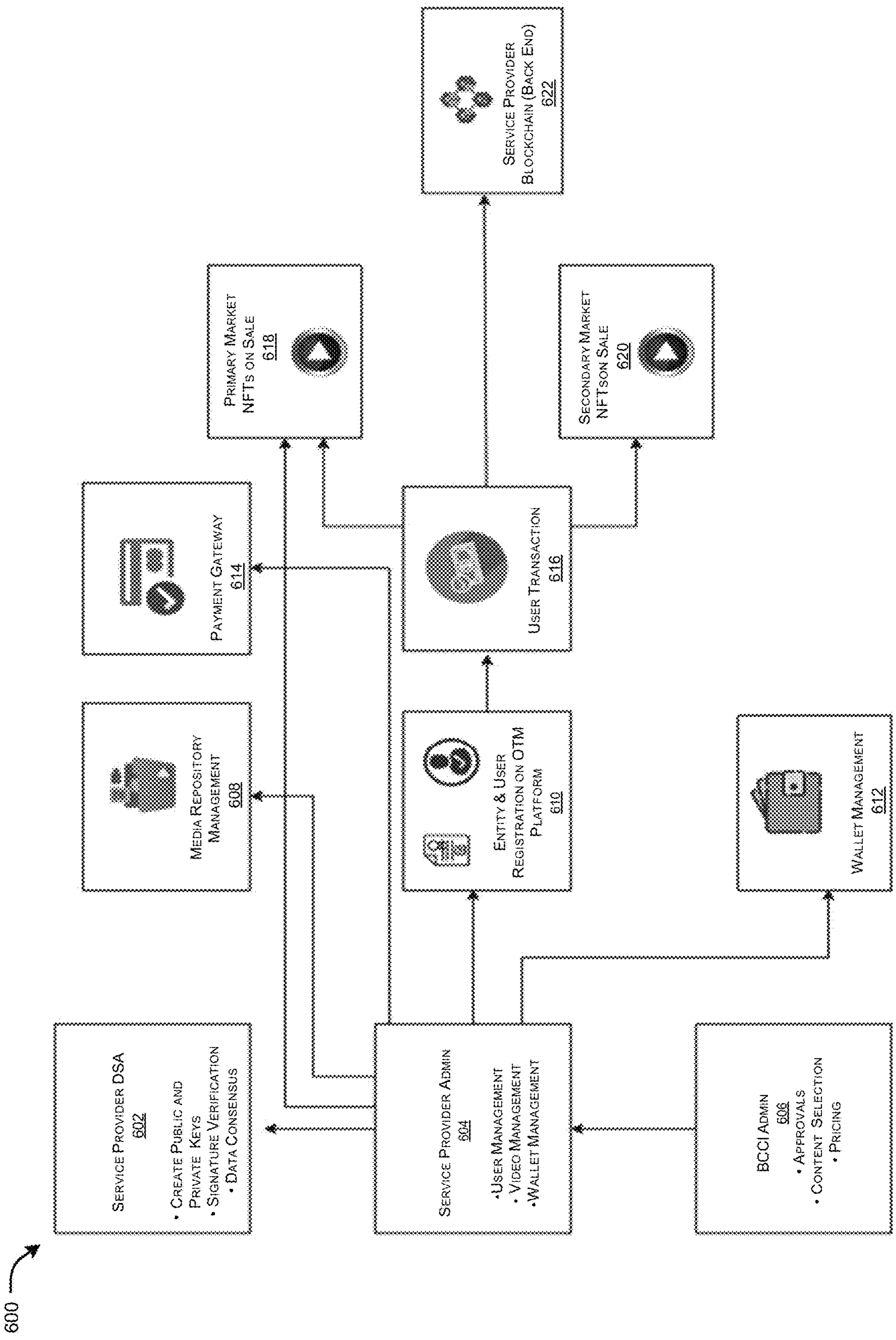
FIG. 6 illustrates an exemplary representation of Out-of-Money (OTM)-BCCI, in accordance with an embodiment of the present disclosure.

FIG. 6 illustrates an exemplary Out-of-Money (OTM)-BCCI representation (600), in accordance with an embodiment of the present disclosure.

With respect to FIG. 6, the OTM-BCCI representation (600) includes a service provider Direct Selling Agent (DSA) (602), a service provider admin (604), and a BCCI admin (606). The service provider DSA (602) may include various functionalities such as create public and private keys, signature verification, and data consensus. The service provider admin (604) may include various functionalities such as user management, video management, and wallet management. The BCCI admin (606) may include various functionalities such as approvals, content selection, and pricing.

In an embodiment, a media repository management (608) relates to unique digital items which may include, but not be limited to, media file, video, audio, image, art, and others.

In an embodiment, an entity and user registration is performed on the OTM platform (610).

In an embodiment, a wallet management (612) may enable management of the user's wallet which includes a credit value for every sale of the NFTs, and a debit value for purchase of the NFTs.

In an embodiment, a payment gateway (614) relates to a server or a path which is set up for enabling payment (credit/debit) related to transactions.

In an embodiment, a user transaction (616) include purchasing NFTs, money transfer, and the like.

In an embodiment, a primary market NFTs on sale (618) pertains to the plurality of copies of the NFTs that are published by the entity using the first computing device in the first market for a fixed price.

In an embodiment, a secondary market NFTs on sale (620) pertains to the purchased plurality of copies of the NFTs that are published by the current owner using second computing device in the second market for the fixed price for trading the purchased NFTs as fungible tokens.

In an embodiment, a service provider blockchain (back end) (622) implementing the blockchain platform.

Figure 7:
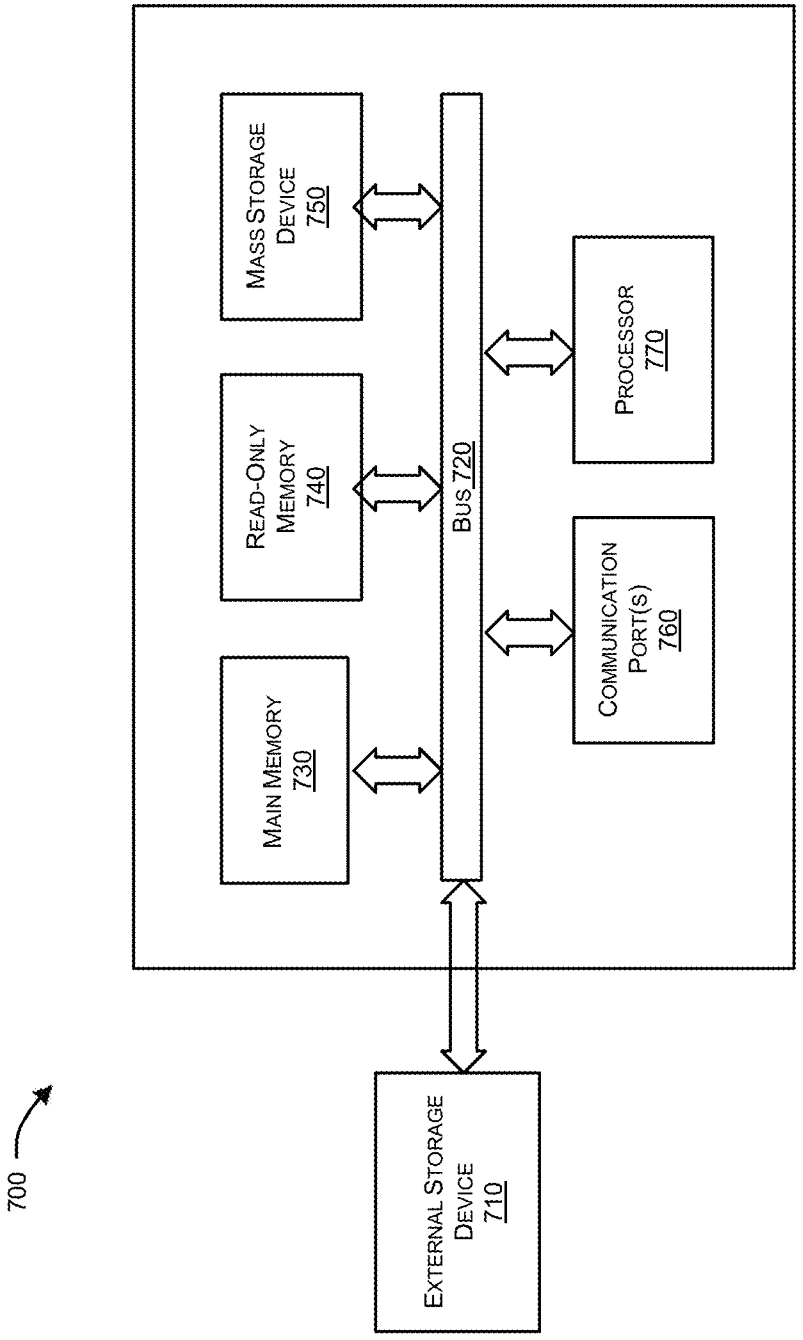
FIG. 7 illustrates an exemplary computer system in which or with which embodiments of the present disclosure may be implemented.

FIG. 7 illustrates an exemplary computer system (700) in which or with which embodiments of the present disclosure may be implemented.

As shown in FIG. 7, computer system (700) may include an external storage device (710), a bus (720), a main memory (730), a read-only memory (740), a mass storage device (750), communication port(s) (760), and a processor (770). A person skilled in the art will appreciate that the computer system (700) may include more than one processor and communication ports. The processor (770) may include various modules associated with embodiments of the present disclosure. The communication port(s) (760) may be any of an RS-232 port for use with a modem-based dialup connection, a 10/100 Ethernet port, a Gigabit or 10 Gigabit port using copper or fibre, a serial port, a parallel port, or other existing or future ports. The communication port(s) (760) may be chosen depending on a network, or any network to which the computer system (700) connects. The main memory (730) may be Random Access Memory (RAM), or any other dynamic storage device commonly known in the art. The read-only memory (740) may be any static storage device(s). The mass storage device (750) may be any current or future mass storage solution, which can be used to store information and/or instructions. The bus (720) communicatively couples the processor (770) with the other memory, storage, and communication blocks.

Optionally, operator and administrative interfaces, e.g. a display, keyboard, and a cursor control device, may also be coupled to the bus (720) to support direct operator interaction with the computer system (700). Other operator and administrative interfaces can be provided through network connections connected through the communication port(s) (760). Components described above are meant only to exemplify various possibilities. In no way should the aforementioned exemplary computer system limit the scope of the present disclosure.

While considerable emphasis has been placed herein on the preferred embodiments, it will be appreciated that many embodiments can be made and that many changes can be made in the preferred embodiments without departing from the principles of the invention. These and other changes in the preferred embodiments of the invention will be apparent to those skilled in the art from the disclosure herein, whereby it is to be distinctly understood that the foregoing descriptive matter to be implemented merely as illustrative of the invention and not as limitation.

ADVANTAGES OF THE PRESENT DISCLOSURE

The present disclosure provides support for Non-Fungible Tokens (NFTs) on a private blockchain platform which is a highly scalable.

The present disclosure provides support for maintaining NFTs on blockchain platforms by creating fractional fungible tokens to be used for sharing an NFT asset.

The present disclosure supports evolving of cryptocurrency space, where the NFT are virtual digital currencies whose identity, authenticity, and traceability are tamper-proof.

The present disclosure provides NFTs that are unique, and hence, cannot be replicated in any case, and are widely popular for selling digital collectibles.

The present disclosure provides support for maintaining NFTs on a permissioned private blockchain platform with fractional ownership.

The present disclosure provides support for fungible sharing of the NFTs on a blockchain platform.

The present disclosure provides an effective utilization of a blockchain-based system to record both trade and post-trade information.

The present disclosure provides a blockchain-based system where valid users can securely register and perform trading.

The present disclosure provides a blockchain platform where user registration will be performed so that fraudulent users are denied participation in a bidding event.

The present disclosure provides a blockchain-based system that is completely transparent and has a trusted environment.

We claim:

1. A system (102) for creating Non-Fungible Tokens (NFTs) on a blockchain platform, the system (102) comprising:

one or more processors (202); and a memory coupled to the one or more processors (202), wherein said memory (204) stores instructions which when executed by the one or more processors (202) cause the system (102) to:

create, by an entity (112) using a first computing device (110), a first market for trading the NFTs, wherein the NFTs are stored along with information pertaining to the entity (112) in a ledger (104) on the blockchain platform; wherein the NFTs are virtual digital currencies whose identity, authenticity, and traceability are tamper-proof, transmit a purchase request pertaining to the NFTs to one or more second computing devices (114) associated with one or more users (116), wherein the first computing device (110) and the one or more second computing devices (114) are communicatively coupled to at least a server (106) through a network (108);

publish, by the entity (112), a plurality of copies of the NFTs in the first market for a fixed price, wherein each of the plurality of copies of the NFTs is associated with a respective sequence number assigned based on a value associated with each of the plurality of copies of the NFTs, wherein each of the respective sequence numbers is associated with a price and the respective sequence number decreases with increase in the price;

credit a sale proceed to a wallet of the entity (112) based on a purchase event of the plurality of copies of the NFTs by a current owner from the one or more users (116), and update the ledger (104) with information of the current owner of the purchased plurality of copies of the NFTs, wherein the sale proceed is a summation of the price associated with each sequence number; and publish, by the current owner, the purchased plurality of copies of the NFTs in a second market for the fixed price for trading the purchased NFTs as fractional fungible tokens.

2. The system (102) as claimed in claim 1, wherein the NFTs comprise at least one of: a utility asset, an investment asset, and unique digital items, and wherein the unique digital items comprise at least one of: a media file, a video, an audio, an image, and an artwork.

3. The system (102) as claimed in claim 1, wherein said memory (204) stores instructions which when executed by the one or more processors (202) causes the system (102) to:

initiate a registration process for admitting the entity (112) by an administrator (402) of the blockchain platform, wherein the registration process comprises at least one of: verification and validation of Know Your Customer (KYC) documents, collection of initial deposit amount, assignment of membership license, set up of payment gateway, and assignment of a super administrator for the entity (112).

4. The system (102) as claimed in claim 1, wherein said memory (204) stores instructions which when executed by the one or more processors (202) causes the system (102) to:

initiate an enrolling process of the one or more users (116) based on an input from the entity (112), wherein the enrolling process comprises at least one of:

collection of Know Your Customer (KYC) details, linking of bank account, Unified Payments Interface (UPI), and cryptocurrency, and collection of an initial joining fee.

5. The system (102) as claimed in claim 1, wherein said memory (204) stores instructions which when executed by the one or more processors (202) causes the system (102) to:

compute a first set of revenue stream for the entity (112), wherein the first set of revenue stream comprises at least one of: a joining fee, a membership fee, a sale proceed of the second market, and a transaction fee.

6. The system (102) as claimed in claim 5, wherein said memory (204) stores instructions which when executed by the one or more processors (202) causes the system (102) to:

compute a second set of revenue stream for the one or more users (116), wherein the second set of revenue stream comprises at least one of: the NFTs obtained from the sale proceed of the second market, the fungible tokens obtained from the sale proceed of the second market, and an advertisement pay-per-click (PPC) revenue or standard revenue.

7. The system (102) as claimed in claim 1, wherein a range of the sequence number is indirectly proportional to a value of an NFT of the plurality of copies of the NFTs.

8. The system (102) as claimed in claim 1, wherein said memory (204) stores instructions which when executed by the one or more processors (202) causes the system (102) to:

manage one or more functional features pertaining to services associated with the NFTs, wherein the one or more functional features comprise at least one of: an ownership provenance, royalties, exchanges, transfer of value, asset protection, and counter measure.

9. The system (102) as claimed in claim 1, wherein the entity (112) comprises at least one of: a business organization, a manufacturer, a government organization, or a trade organization.

10. A method for creating Non-Fungible Tokens (NFTs) on a blockchain platform, the method comprising:

creating, by an entity (112) using a first computing device (110) via a system (102), a first market for trading the NFTs, wherein the NFTs are stored along with information pertaining to the entity (112) in a ledger (104) of the blockchain platform, wherein the NFTs are virtual digital currencies whose identity, authenticity, and traceability are tamper-proof, transmitting, by the system (102), a purchase request pertaining to the NFTs to one or more second computing devices (114) associated with one or more users (116);

publishing, by the entity (112) via the system (102), a plurality of copies of the NFTs in the first market for a fixed price, wherein the each of the plurality of copies of the NFTs is associated with a respective sequence number assigned based on a value associated with each of the plurality of copies of the NFTs, wherein each of the respective sequence numbers is associated with a price and the respective sequence number decreases with increase in the price;

crediting, by the system (102), a sale proceed to a wallet of the entity (112) based on a purchase event of the plurality of copies of the NFTs by the one or more users (116), and updating the ledger (104) with the information of a current owner of the purchased plurality of copies of the NFTs, wherein the sale proceed is a summation of the price associated with each sequence number; and publishing, by the current owner via the system (102), the purchased plurality of copies of the NFTs in a second market for the fixed price for trading the purchased NFTs as fractional fungible tokens, wherein the first computing device (110) and the one or more second computing devices (114) are communicatively coupled to at least a server (106) through a network (108).

11. The method as claimed in claim 10, wherein the NFTs comprise at least one of: a utility asset, an investment asset, and unique digital items, and wherein the unique digital items comprise at least one of: a media file, a video, an audio, an image, and an art.

12. The method as claimed in claim 10, comprising:

initiating, by the system (102), a registration process for admitting the entity (112) based on an input from an administrator of the blockchain platform, wherein the registration process comprises at least one of: verifying and validating Know Your Customer (KYC) documents, collecting initial deposit amount, assigning membership license, setting up of payment gateway, and assigning a super administrator for the entity (112).

13. The method as claimed in claim 10, comprising:

initiating, by the system (102), an enrolling process of the one or more users (116) by the entity (112), wherein the enrolling process comprises at least one of: collecting Know Your Customer (KYC) details, linking bank account, Unified Payments Interface (UPI), and cryptocurrency, and collecting an initial joining fee.

14. The method as claimed in claim 10, comprising:

computing, by the system (102), a first set of revenue stream for the entity (112), wherein the first set of revenue stream comprises at least one of: a joining fees, a membership fee, a sale proceed of the second market, and a transaction fee.

15. The method as claimed in claim 14, comprising:

computing, by the system (102), a second set of revenue stream for the one or more users (116), wherein the second set of revenue stream comprises at least one of: the NFTs obtained from the sale proceed of the second market, the fungible tokens obtained from the sale proceed of the second market, and an advertisement pay-per-click (PPC) revenue or standard revenue.

16. The method as claimed in claim 10, wherein a range of the sequence number is indirectly proportional to a value of an NFT of the plurality of copies of the NFTs.

17. The method as claimed in claim 10, comprising:

managing, by the system (102), one or more functional features pertaining to services associated with the NFTs, wherein the one or more functional features comprise at least one of: an ownership provenance, royalties, exchanges and transfer of value, asset protection, and counter measure.

18. A non-transitory computer readable medium comprising processor-executable instructions that cause a processor to:

create, by an entity (112) using a first computing device (110), a first market for trading Non-Fungible Tokens (NFTs), wherein the NFTs are stored along with information pertaining to the entity (112) in a ledger (104) of a blockchain platform, wherein the NFTs are virtual digital currencies whose identity, authenticity, and traceability are tamper-proof;

transmit a purchase request pertaining to the NFTs to one or more second computing devices (114) associated with one or more users (116);

publish, by the entity (112), a plurality of copies of the NFTs in the first market for a fixed price, wherein the each of the plurality of copies of the NFTs is associated with a respective sequence number assigned based on a value associated with each of the plurality of copies of the NFTs, wherein each of the respective sequence numbers is associated with a price and the respective sequence number decreases with increase in the price;

credit a sale proceed to a wallet of the entity (112) based on a purchase event of the plurality of copies of the NFTs by the one or more users (116), and update the ledger (104) with the information of a current owner of the purchased plurality of copies of the NFTs, wherein the sale proceed is a summation of the price associated with each sequence number; and publish, by the current owner, the purchased plurality of copies of the NFTs in a second market for the fixed price for trading the purchased NFTs as fractional fungible tokens, wherein the first computing device (110) and the one or more second computing devices (114) are communicatively coupled to at least a server (106) through a network (108).

* * * * *